United States Patent

[11] 3,602,077

| [72] | Inventor | George A. Mitchell<br>687 Prospect Crescent, Pasadena, Calif. 91103 |
|---|---|---|
| [21] | Appl. No. | 87,935 |
| [22] | Filed | Nov. 9, 1970 |
| [45] | Patented | Aug. 31, 1971 |

[54] TOOL POST AND HOLDER
8 Claims, 6 Drawing Figs.

[52] U.S. Cl. .................................................... 82/36 R
[51] Int. Cl. ...................................................... B23b 29/04
[50] Field of Search .......................................... 82/36, 37, 36 A

[56] References Cited
FOREIGN PATENTS
1,080,378  4/1960  Germany .................... 82/36

*Primary Examiner*—Leonidas Vlachos
*Attorney*—Charlton M. Lewis

ABSTRACT: A toolpost is formed of a block with the horizontal sectional form of an octagon with equal angles and with two mutually perpendicular side faces of equal width, with an axial bore and with two cross bores perpendicular to the respective equal side faces and radially intersecting the axial bore. Headed plungers slide in the cross bores and are controlled by a common shaft journaled in the axial bore to clamp a toolholder releasably at either of the equal side faces of the block.

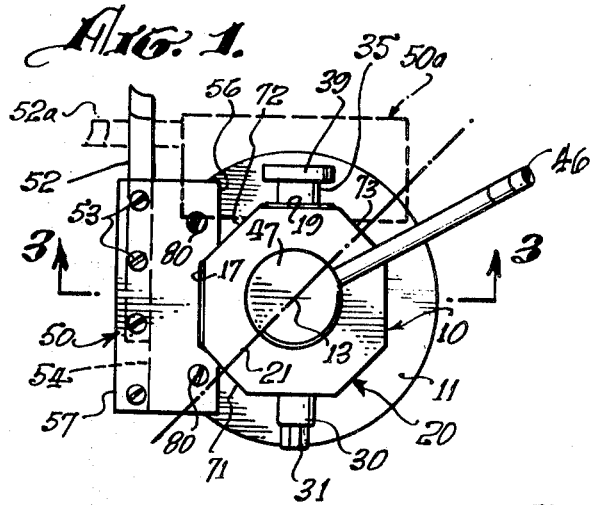
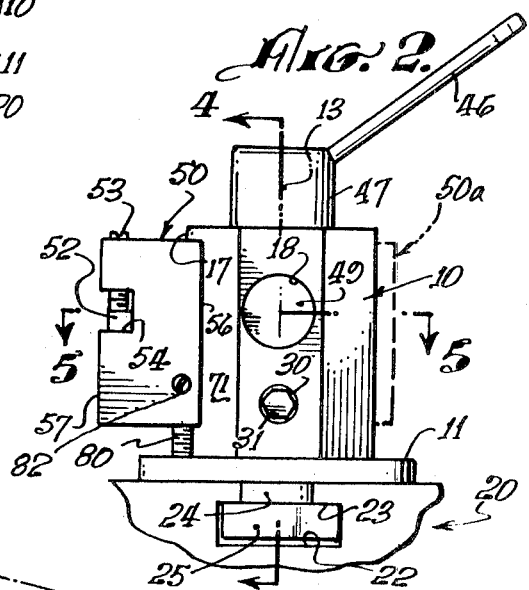

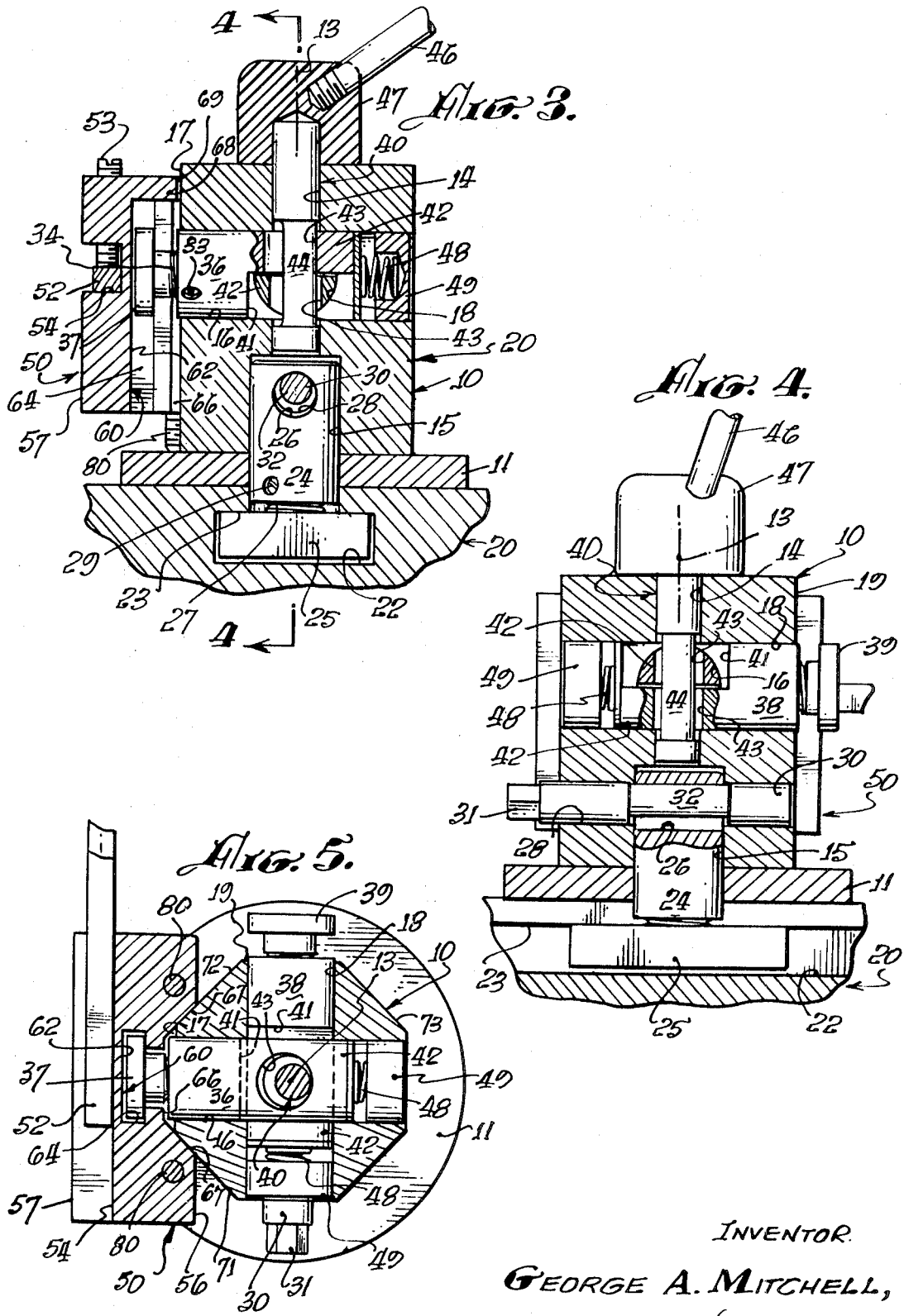

TOOL POST AND HOLDER

This invention is concerned with toolposts and associated sets of toolholders for mounting cutting tools on a lathe or similar machine tool. The invention relates more particularly to toolposts which provide more than one position in which a toolholder may be interchangeably mounted.

The present invention aims to provide toolpost structure of the described type that is economical to manufacture and that will permit highly accurate, rigid and reproducible tool placement without requiring complicated defining surfaces. The invention further permits very rapid and convenient interchange of toolholders or of tool positions.

A further important object of the invention is to provide a toolpost structure of such form that chips and other debris do not accumulate on or near the mating surfaces by which the toolholder is locked in place on the toolpost. Hence accuracy of tool placement can be assured without laborious cleaning of such surfaces each time the tool position is shifted.

Many different toolpost structures have been described in the prior art, but all previous structures with which I am acquainted suffer from serious disadvantages. In particular, previous toolposts with interchangeable tool positions tend to be unduly expensive to manufacture because of their inherently complex structure. In many prior art structures exposed surfaces form acute reentrant angles which are difficult to keep clean. When such angles or pockets are formed by the active mating surfaces between toolholder and toolpost, the pockets associated with an idle mounting position tend to accumulate chips produced during machining with a tool mounted in another position. Such chips must be carefully removed if proper accuracy is to be maintained when the tool position is changed. That is particularly true of the dovetail mating surfaces shown by Dagusta U.S. Pat. No. 2,730,918, Hirvonen U.S. Pat. No. 2,878,705 and Holmes U.S. Pat. No. 3,280,673, for example. The same thing is true in lesser degree in Bergstrom U.S. Pat. No. 2,148,852, which has the further disadvantage that tool positions cannot be interchanged without shifting a handle between two operating boltheads.

The present invention avoids those and other disadvantages of the prior art and accomplishes the above-described general purposes primarily by simplifying the exterior form of the present toolpost structure so greatly as to virtually eliminate the accumulation of debris on the mating surfaces, and by providing a particularly simple and effective mechanism for controlling a plurality of mounting positions on the toolholder. That mechanism permits a plurality of tool positions to be controlled by a single handle, which may be retained in operating position during machining if desired.

A full understanding of the invention, and of its further objects and advantages, will be had from the following description of an illustrative form in which it may be carried out.

The particulars of that description, and of the accompanying drawings which form a part of it, are intended only as illustration and not as a limitation upon the scope of the invention, which is defined in the appended claims.

In the drawings:

FIG. 1 is a plan representing an illustrative form of the invention;

FIG. 2 is an elevation;

FIG. 3 is a section on line 3—3 of FIG. 1;

FIG. 4 is a section on line 4—4 of FIG. 2;

FIG. 5 is a section on line 5—5 of FIG. 2; and

FIG. 6 is an exploded schematic perspective.

As shown illustratively in the drawings, the toolpost proper is designated generally by the numeral 10, with the typical toolholder 50 and tool 52 mounted in one of two alternative positions on the toolpost. A second position for mounting a toolholder is indicated in phantom lines at 50a in FIGS. 1 and 2 with a mounted tool at 52a. Toolpost 10 is typically supported on the circular base plate 11 on the cross slide of a lathe or the like. Such a cross-slide is shown in fragmentary form at 20 with the conventional mounting slot 22, undercut at 23.

Toolpost 10 comprises a main block 12, which has a vertical axis 13 and a transverse section that is uniform over the axial length of the block. That section preferably has the form of a regular octagon, as shown best in FIGS. 1 and 5. However, it is sufficient for many of the purposes of the invention if the portion of block 12 above and to the left of the line 21 in FIG. 1 has the sectional form of an octagon with equal angles and if the two mutually perpendicular faces 17 and 19 are of equal width. The portion of block 12 below and to the right of line 21 in FIG. 1 may have any desired external form. However, the symmetrical form illustrated has the great advantage that the block may be made from octagonal bar stock, and then requires a minimum of machining to true the top and bottom faces, the two mutually perpendicular faces 17 and 19, and the three oblique working faces 71, 72 and 73 which are adjacent to them.

Block 12 has a vertical bore 14 on block axis 13, and has the two horizontal cross bores 16 and 18, which intersect each other and bore 14 radially, and which open outwardly through the respective block side faces 17 and 19. Axial bore 14 is considerably smaller in diameter than the cross bores at their intersection, but its lower end portion is counterbored at 15. That enlarged portion of the axial bore is intersected by the small horizontal cross bore 28.

Toolpost 10 is clamped in selected position on cross-slide 20 by the headed plunger 24, which is slidably mounted in the enlarged lower portion of axial bore 14. Plunger 24 projects downwardly through a fitting bore in base plate 11 and is slidable longitudinally in mounting slot 22 of cross-slide 20 with the plunger head 25 retained by undercut 23. If plunger head 28 is rectangular, it is preferably rotatably mounted on the body of plunger 24, so that the toolpost is readily adjustable both in angle about its vertical axis and longitudinally of slot 22. The clamping action of plunger 24 is controlled by the mounting shaft 30, which is journaled in cross bore 28 and carries a suitable fitting 31 for connection of an operating handle, not shown. The central portion of shaft 28 is freely received in a suitably placed aperture 26 in plunger 24, and is formed as an eccentric cam 32. Clockwise shaft rotation toward the position shown in FIG. 3 raises plunger 24, preferably producing fully clamped condition of the post just before cam 32 reaches dead center position. The clamp mechanism is then effectively locked by friction. To ensure accurate locking action and to compensate for possible wear, plunger head 25 is preferably axially adjustable with respect to the body of plunger 24, as by the threads 27 and the locking setscrew 29, as indicated in FIG. 3.

The mechanism for mounting the toolholders comprises the two plungers 36 and 38, which are longitudinally slidable in the respective cross bores 16 and 18 of the toolpost and which carry the clamping heads 37 and 39 at their outer ends. As shown, those mounting heads are formed by the peripheral grooves 35, and thus have the same diameter as the main plunger body. Each of the plungers is half cut away at 41 at the intersection of the two cross bores, leaving a half-round section 42. A transverse bore 43 is provided in that section in general alignment with axial bore 14 of the toolpost.

Sliding movement of plungers 36 and 38 in their cross bores is controlled by the single operating shaft 40, which is journaled in vertical bore 14 on axis 13. Shaft 40 passes through the apertures 43 of both plungers 36 and 38. The shaft portion that is within the plungers is offset relative to the shaft axis to produce the two eccentric cam formations indicated jointly by the numeral 44. Those cams engage the sidewalls of apertures 43 at suitable points to drive the plungers inward in their bores in response to cam rotation. Each plunger is yieldably urged outward into firm engagement with its cam 44 by the coil spring 48, acting between a washer at the inner end of the plunger and the plug 49, which is threaded or otherwise secured in the cross bore. The operating handle 46 is rigidly mounted on shaft 40 by means of the hub 47. That handle may be made readily removable, if desired, though it is usually convenient to maintain it always in operating position.

Toolholder 50 comprises a generally rectangular block with the mounting face 56, which is vertically grooved at 60. The opposite face 57 of the block is then available for mounting the cutting tool, for which any desired mounting structure may be provided. As typically shown, face 57 is horizontally grooved at 54, and tool 52 is rigidly clamped in groove 54 by the clamp screws 53.

Mounting groove 60 has a relatively deep portion 62 for receiving the outer end of plunger 36 or 38. That relatively deep portion of the groove is adapted to receive the outer end of mounting plunger 36 or 38, and is undercut at 64 to retain the plunger head 37 or 39. Groove 60 also has a relatively shallow portion 66 with outwardly flaring sidewalls 67. Those sidewalls are mutually perpendicular, and are thus adapted to flatly engage either the oblique side faces 71 and 72 of toolpost block 12 that are adjacent block face 17, or the side faces 72 and 73 adjacent block face 19. The relatively shallow portion of mounting groove 70 extends the full vertical height of mounting face 56 of the toolholder, opening through its top and bottom end faces and providing clearance for spanning the whole width of face 17 of the toolpost. On the other hand, the relatively deep portion of mounting groove 60 opens through the bottom face of the toolholder but is closed by the wall 68 at its upper end. Thus the top face of the toolholder is continuous nearly to the toolpost, leaving only a narrow clearance slot 69 (FIG. 3) between the toolholder and face 17 of the toolpost. That slot is exaggerated in width in the drawings for clarity of illustration.

The sections of cam formation 44 may be formed in any desired orientation with respect to each other and to control handle 46. It is generally preferred, however, to form both cams as a single eccentric section of the shaft. Not only is that design simpler and more economical to construct, but it facilitates operation, since the handle positions for locking and releasing toolholders in the two alternative positions then bear the same angular relationships to the mounted toolholder. Convenient adjustment of the cam action is preferably provided, both for producing the desired relation between the locking angle of the cam and its dead center position, and for compensating for possible wear. As indicated at 34 in FIG. 3, the head of each plunger 36 and 38 may be threaded into the plunger body, with the locking screws 33 for retaining the parts in adjusted position.

The described locking mechanism can accept and lock a toolholder over a wide range of vertical positions along the axis of groove 60. Convenient adjustment of the height of the toolholder is provided by means of the adjusting screws 80, which are threaded in vertical bores in the toolholder on opposite sides of mounting groove 60. Those screws bear on the flat upper face of mounting plate 11, ensuring accurate and reproducible definition of the tool height regardless of changes in the position or angle of the entire toolpost with respect to its support on the lathe or the like. Screws 80 may conveniently be adjusted in a separate fixture to give the desired relation between the mounted tool 52 and the lathe axis. The adjustment is then locked by the setscrews 82 (FIG. 2).

I claim:

1. In a toolpost structure for a lathe or the like, the combination of
   a block having an axis and having the transverse sectional form, at least on one side of the axis, of an octagon with equal angles and with two mutually perpendicular side faces of equal width, the block having an axial bore and two cross bores that intersect the axial bore essentially radially and open perpendicularly through the respective equal side faces of the block,
   a shaft journaled in the axial bore with handle means at one end of the block,
   plungers slidably mounted in the respective cross bores, each plunger being apertured at its inner end portion to receive the shaft and carrying at its outer end a head spaced outwardly from the block side face,
   a toolholder having an axis and a mounting face that is axially grooved, the groove having a relatively deep portion that is undercut to slidingly receive a plunger head, the groove having a relatively shallow portion that has oblique sidewalls for engaging the two oblique block side faces adjacent a selected one of said equal side faces, while spanning said one side face,
   cam formations on the shaft within the respective plunger apertures for driving the plungers inward in their bores in response to shaft rotation to clamp the toolholder to the block at a selected plunger head,
   and means at the other end of the block for mounting the same on a lathe slide or the like with the block axis vertical.

2. The combination defined in claim 1, and in which
   the toolholder has top and bottom end faces intersecting said mounting face,
   said relatively deep portion of said groove opens axially through the bottom face but is closed at the top face,
   and said relatively shallow portion of said groove opens axially through both end faces of the toolholder.

3. The combination defined in claim 1, and in which the block has the transverse sectional form of a regular octagon.

4. The combination defined in claim 1, and in which
   said cross bores lie in a common plane perpendicular to the axial bore,
   and each of said plungers if of semicircular transverse section throughout an inner end portion of its length that includes the region of said plunger apertures.

5. The combination defined in claim 1, and including
   resilient means yieldably urging each of said plungers outward in its cross bore to maintain engagement with said cam formations.

6. The combination defined in claim 1, and in which
   each of said plungers comprises two members joined by coaxial screw threads for mutual axial adjustment, one member including the plunger head and the other member including the plunger aperture, and means for releasably locking the screw threads.

7. The combination defined in claim 1, and in which said means for mounting the block comprise
   a mounting member slidable in said axial bore in axially spaced relation from said shaft,
   head structure carried by the mounting member and spaced from said other end of the block for engaging an undercut slot in a lathe slide or the like,
   an operating cam rotatably mounted on the block and engaging the mounting member for driving the same toward said one end of the block to clamp the block to the lathe slide or the like,
   and means for manually rotating the cam.

8. The combination defined in claim 7, and in which said mounting member and said head structure are joined by coaxial screw threads for mutual axial adjustment, with means for releasably locking the screw threads.